United States Patent [19]

Furukawa et al.

[11] Patent Number: 5,467,111
[45] Date of Patent: Nov. 14, 1995

[54] TRANSPORTING APPARATUS FOR SCANNING EXPOSURE

[75] Inventors: Koji Furukawa; Chikashi Ohishi, both of Shizuoka, Japan

[73] Assignee: Fuji Photo Film Co., Ltd., Kanagawa, Japan

[21] Appl. No.: 894,335

[22] Filed: Jun. 4, 1992

[30] Foreign Application Priority Data

Jun. 6, 1991 [JP] Japan ................................. 3-134742
Aug. 15, 1991 [JP] Japan ................................. 3-205044

[51] Int. Cl.$^6$ ................................................ H04N 1/10
[52] U.S. Cl. ........................................ 346/134; 355/234
[58] Field of Search ............................ 346/134, 139 R, 346/139 D; 355/72, 75, 234; 358/496, 302; 248/638; 347/104

[56] References Cited

U.S. PATENT DOCUMENTS

| | | | |
|---|---|---|---|
| 4,602,262 | 7/1986 | Milligan et al. | 346/160 |
| 4,669,327 | 4/1987 | Aratsu | 74/409 |
| 4,921,365 | 5/1990 | Sanders, Jr. et al. | 400/322 |
| 5,100,096 | 3/1992 | Mizuno et al. | 248/638 |
| 5,225,853 | 7/1993 | Kobayashi et al. | 346/140 R |

*Primary Examiner*—Benjamin R. Fuller
*Assistant Examiner*—Craig A. Hallacher
*Attorney, Agent, or Firm*—Sughrue, Mion, Zinn, Macpeak & Seas; Richard C. Turner

[57] ABSTRACT

The improved transporting apparatus for scanning exposure of a recording material as it is fixed on an exposure mount which is moved by means of a screw transmission mechanism is characterized in that the exposure mount for transporting the recording material is composed of a platen for carrying the recording material and a transport plate that holds the platen and which engages the screw transmission mechanism, with the platen and the transport plate being designed to be capable of relative displacement by small amounts, preferably in a non-contact relationship. Optionally, urging members may be provided to combine with the platen and the transport plate to form a vibration system that composes a vibration filter. The apparatus effectively absorbs not only vibrations that originate from the drive system to be transmitted to the exposure mount via the travelling nut of the screw transmission mechanism, as exemplified by erratic rotation or vibrations of the motor and the screw shaft of the screw transmission mechanism, but also vibrations due to externally applied forces and, hence, highly precise scanned transport of the recording material can be accomplished while suffering from very small levels of unevenness in the speed of its transport that will occur on account of those unwanted vibrations.

20 Claims, 5 Drawing Sheets

TRANSPORTING APPARATUS FOR SCANNING EXPOSURE

BACKGROUND OF THE INVENTION

This invention relates-to a transporting apparatus for scanning exposure that is suitable for use with an image reading and/or recording apparatus, that adopts a screw transmission mechanism and that causes only limited erratic transport of a reading and/or recording material.

Optical scanning such as raster scanning and slit scanning is applied to various types of image recording apparatus. In image recording apparatus of a type that adopts raster scanning, a recording light beam is deflected one-dimensionally in the direction of main scanning while a recording material is transported for sub-scanning in a direction generally perpendicular to the direction of main scanning and, as a result, the light beam is scanned two-dimensionally over the entire surface of the recording material, thereby recording an image on it. In image recording apparatus of a type that adopts slit scanning, a recording light source forming a slit is transported for scanning in a direction generally perpendicular to the length of the slit, or a recording material is transported for scanning relative to the light source in a slit form, whereby the recording light is scanned over the entire surface of the recording material to record an image.

With these apparatus that adopt raster scanning or slit scanning, it is well known to transport a large-size document or recording material by means of a transporting apparatus for light beam scanning in which an exposure mount for fixing an object to be scanned such as the document or recording material is moved by a screw transmission mechanism composed of a drive screw (hereunder referred to as "a screw shaft") and a travelling nut (hereunder referred to simply as "a nut"). See, for example, Japanese Utility Model Laid-Open Application (jikkai) No. 184367/1986, which proposes an image recording apparatus that performs transport in the sub-scanning direction using a transporting apparatus with a screw transmission mechanism and that uses a servo motor as a source for rotationally driving the screw shaft with a view to achieving even and correct transport in the sub-scanning direction.

In order to achieve satisfactory image recording without causing any unevenness in the quality of image, it is necessary that the recording material be transported for scanning at a constant speed in a correct and even manner. However, the aforementioned image recording apparatus which simply uses a servo motor suffers from the disadvantage that external forces, such as those applied by vibrations due to erratic rotation of the motor or eccentricity of the screw shaft, as well as those applied by impacts, and those applied by vibrations due to variations in the force of friction with guide members during the movement of the exposure mount or due to the seams of the guide members, cause the exposure mount to vibrate, leading to an erratic transport of the recording material.

As already mentioned, the exposure mount (or the recording material to be scanned) must be transported at a predetermined constant speed in a correct manner in order to accomplish satisfactory image recording. However, if unevenness occurs in the transport speed on account of the factors described above, the recorded image will have unevenness in color and density in the sub-scanning direction.

Unevenness in the sub-scanning speed (i.e., the speed of transport of the recording material to be scanned) bears particular importance in image recording apparatus that adopt raster scanning because unevenness occurs in the pitch of main scanning lines, producing an image in which noticeable unevenness appears as stripes in the sub-scanning direction.

The transporting apparatus for scanning exposure that transports the recording material by moving the exposure mount with the aid of a screw transmission mechanism has not yet solved the aforementioned problems of erratic transport due to erratic rotation of the motor or eccentricity of the screw shaft, or erratic transport due to external vibrations or forces such as those exerted by the exposure mount when it rides over the seams of guide members or variations in the transport load due to changes in the force of friction between the guide members and the exposure mount. This has presented particular difficulties in applying the transporting apparatus to image recording apparatus that adopt raster scanning.

BRIEF SUMMARY OF THE INVENTION

The present invention has been accomplished under these circumstances and has as its principal object providing a transporting apparatus for scanning exposure of a recording material as it is fixed on an exposure mount which is moved by means of a screw transmission mechanism and that absorbs not only vibrations originating from a drive system to be transmitted to the exposure mount via the nut, as exemplified by erratic rotation and vibrations of the motor and the screw shaft but also vibrations due to external forces, whereby the recording material is prevented from experiencing erratic scanned transport on account of those phenomena.

Another object of the present invention is to provide a transporting apparatus for scanning exposure which, in addition to the feature described above, has the advantage that the recording material is fixed without using any suction apparatus such as a vacuum pump, a suction pump or a suction hose that can cause vibrations in the exposure mount or variations in the transport load, whereby the erratic scanned transport of the recording material that may occur due to the dragging of a suction hose over the base is eliminated while, at the same time, the recording material can be fixed in a more effective manner.

To achieve the above-described objects, there is provided by an embodiment of its first aspect of the present invention a transporting apparatus for scanning exposure of a recording material which comprises:

a screw transmission mechanism having a drive screw and a travelling nut that meshes with said drive screw;

an exposure mount composed of a platen for carrying said recording material and a transport plate that supports said platen in a relatively displaceable manner and which engages with the travelling nut of said screw transmission mechanism; and, an engaging means provided on the underside of said transport plate for achieving engagement between said transport plate and said screw transmission mechanism.

There is provided by an embodiment of its second aspect of the present invention a transporting apparatus for scanning exposure of a recording material wherein, in said apparatus of the first aspect of the present invention, said recording material has a recording layer on an electroconductive support, the platen of said exposure mount having a base at least part of which is formed of a electroconductive material, said apparatus further including a power supply for applying a voltage to both the conductive support of said recording material and the base of said platen so that said recording material is fixed to said platen by electrostatic attraction.

Preferably, in the first and second aspects, said exposure mount has a platen support means for supporting said platen in such a way that it does not contact said transport plate.

There is provided by an embodiment of its third aspect of the present invention a transporting apparatus for scanning exposure of a recording material wherein, in said apparatus of the first aspect of the present invention, said exposure mount has urging members that couple said platen and said transport plate and which combine with said platen and said transport plate to compose a vibration filter.

There is provided by an embodiment of its fourth aspect of the present invention a transporting apparatus for scanning exposure of a recording material wherein, in said apparatus of the third aspect of the present invention, said recording material has a recording layer on an electroconductive support, the platen of said exposure mount having a base at least part of which is formed of an electroconductive material, said apparatus further including a power supply for applying a voltage to both the conductive support of said recording material and the base of said platen so that said recording material is fixed to said platen by electrostatic attraction.

Preferably, in the third and fourth aspects, the transport plate of said exposure mount further has dampers attached thereto for acting on said platen and said exposure mount has a platen support means for supporting said platen in such a way that except for the urging members as components of said vibration filter, said platen does not contact said transport plate.

Preferably, in each aspect, said platen support means is capable of keeping said platen afloat by magnetic force so that it does not contact any part of said transport plate.

Preferably, said engaging means is capable of fixing the travelling nut of said screw transmission mechanism to the underside of the transport plate of said exposure mount.

Preferably, said engaging means has two support members on opposite sides of the travelling nut of said screw transmission mechanism that are attached to said transport plate and an urging member that is interposed between one of said support members and said travelling nut, said urging member pressing said travelling nut against the other support member so that said nut engages fixedly with said transport plate.

Preferably, said engaging means has two support members that are attached to said transport plate in a position that crosses over the travelling nut of said screw transmission mechanism in the direction of movement of said nut and two urging members that are provided on opposite sides of said nut in such a way that each urging member is interposed between either of said support members and said nut, said urging members pressing said travelling nut from opposite sides so that said nut engages with said transport plate.

DETAILED DESCRIPTION OF THE INVENTION

Figure 1A:
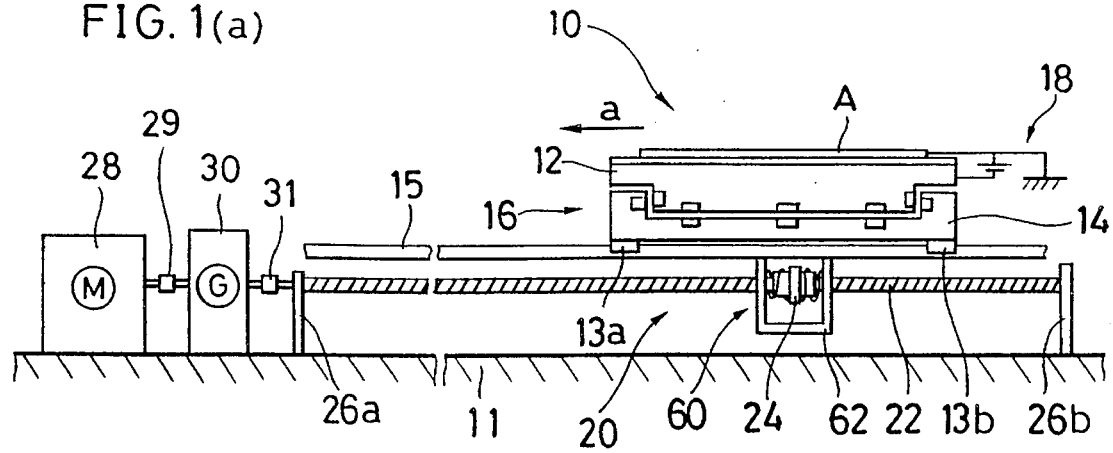
FIGS. 1a and 1b are diagrammatic cross sections that show, from the front, two different phases of the use of a transporting apparatus for scanning exposure according to an embodiment of the present invention.

Conventionally, there has been known a transporting apparatus for scanning exposure of a recording material as it is fixed on an exposure mount which is moved by means of a screw transmission mechanism; in this type of transporting apparatus, a transport means such as a screw transmission means is brought into engagement with the exposure mount, which is moved to perform scanned transport the recording material.

However, in these prior art devices for scanned transport, vibrations externally applied to the transport plate, such as vibrations due to erratic rotation of the motor in the screw transmission means, variations in the force of friction between guide members and the exposure mount (or members for engagement with the guide members that are provided on the exposure mount), vibrations that develop when the exposure mount rides over the seams of the guide members, as well as vibrations due to the rotation or rolling of bearings, rollers, etc. that are arranged in the members for engagement, and variations in frictional force, are directly transmitted to the exposure mount and the recording material will be transported at uneven speeds, making it impossible to achieve satisfactory image recording.

The present inventor previously noted that a vibration system composed of springs and weights (material particles) was unable to follow vibrations at frequencies higher than the resonant frequency (cutoff frequency) of its own; on the basis of that finding, in commonly assigned Japanese Patent Application No. 86998/1991 he proposed a transporting apparatus for scanning exposure that achieved engagement between the exposure mount and a nut in a screw transmission mechanism by urging members such as springs provided on opposite sides of the nut. The proposed apparatus uses pressing members that are attached to the exposure mount parallel to the direction of movement of the nut in such a position that they cross over the nut, as well as urging members that are arranged on opposite sides of the nut in such a way that each is provided between the nut and either pressing member, with the urging members pressing the nut from opposite sides to have the nut engage with the exposure mount. Because of this arrangement, the apparatus insures that vibrations originating from the drive system due to erratic rotation of the motor or eccentricity of the screw shaft which would otherwise be transmitted to the exposure mount via the nut are effectively absorbed by the urging members provided between the pressing members and the nut. Stated more specifically, in the apparatus under consideration, the exposure mount and the urging members form a vibration system (lowpass vibration filter) and vibrations being transmitted from the nut at frequencies higher than the cutoff frequency, such as erratic movement of the nut and vibrations due to erratic rotation of the motor or screw shaft or eccentricity of the shaft, are effectively absorbed between the nut and each urging member, whereby the erratic scanned transport that would otherwise occur on account of those vibrations is sufficiently reduced to insure that the recording material is correctly transported for scanning without any unevenness in transport speed.

As described above, the transporting apparatus for scanning exposure that is proposed by Japanese Patent Application No. 86998/1991 is capable of effectively solving the problem of errative transport due to the erratic rotation of the motor or screw shaft or the eccentricity of the shaft; however, even this apparatus does not successfully solve the problem of errative transport due to external vibrations or forces, as exemplified by variations in transport load due to changes in the force of friction between guide members and the moving exposure mount, as well as impacts and vibrations that occur when the exposure mount rides over the seams of the guide members. Thus, in the transporting apparatus of a type that transports the exposure mount by a screw transmission mechanism, the problem of erratic transport could not be solved merely by improving the means of achieving engagement between the exposure mount and the nut of the screw transmission mechanism and a further improvement has been desired.

In the transporting apparatus according to a first aspect of the present invention, the exposure mount for transporting a recording material is composed of a platen for carrying the recording material and a transport plate that holds the platen in such a way that the two plates are independently displaceable relative to each other, preferably in a contactless manner as achieved by magnetic levitation of the platen above the transport plate, and that is transported by a screw transmission mechanism.

In this transporting apparatus, externally applied vibrations and forces such as variations in the load of transport due to uneven friction between the moving exposure mount and guide members, impacts that develop when the exposure mount rides over the seams of the guide members, and vibrations due to the rotation or rolling of bearings or rollers provided in the engaging members on the exposure mount, are effectively absorbed between the transport plate and the platen which are in contactless engagement and, as a result, vibrations and uneven speeds of the transport plate which would otherwise cause erratic scanned transport of the recording material will never be transmitted to the platen on which the recording material is fixed.

According to a second and a fourth aspect of the present invention, the recording material is fixed onto the platen by means of electrostatic attraction. This obviates the need of connecting the platen to a suction means by a suction hose or some other connecting means, so there will be neither variations in the load of moving the transport plate (or platen) nor vibrations that would otherwise occur in the platen if a suction hose contacted the base or some members on the base. Another advantage that results from fixing the recording material onto the platen by electrostatic attraction is that the platen can be held in a completely noncontact relationship with not only the transport plate but any other members, thereby preventing the platen from vibration on account of external effects.

In a preferred embodiment, the exposure mount (transport plate) may be brought into engagement with the screw transmission mechanism by an engaging means that comprises pressing members provided to cross over the nut of the screw transmission mechanism and urging members that are provided on opposite sides of the nut in such a way that each is held between either pressing member and the nut. This arrangement is effective for further damping the vibrations that originate from the vibration system to be transmitted to the exposure mount via the nut, whereby the recording material can be transported for scanning in a more correct way.

In the transporting apparatus according to a third and a fourth aspect of the present invention, the exposure mount is composed of a transport plate which engages the drive unit such as the screw transmission mechanism and a platen that is held by the transport plate and which carries the recording material in a fixed position as in the first and the second aspect. In addition, the transport plate and the platen are coupled by urging members such as springs to compose a vibration filter.

In other words, the transporting apparatus according to the third aspect of the present invention forms a vibration system by means of the coupling between the platen and the transport plate of the exposure mount, thus composing a vibration filter of those components. Preferably, the resonant frequency of the vibration system is set to be lower than the rotating frequency of the motor, so that erratic rotation of the motor or the screw shaft and other vibrations that are transmitted to the transport plate at frequencies lower than the resonant frequency, as exemplified by impacts that develop when the exposure mount rides over the seams of the guide members and vibrations due to rotation or rolling of bearings and rollers that are provided in members that contact the guide members, are effectively absorbed by the vibration system.

Another advantage of this arrangement is that vibrations due, for example, to erratic rotation of the motor need not be absorbed by means of the portion in which the transport plate engages the transmission mechanism; hence, the transport plate can be brought into fixed engagement with the transmission mechanism, thereby eliminating any adverse effects such as variations in the load of moving the transport plate that occur due to uneven friction between the transport plate and the guide members.

Accordingly, by applying devices for scanned transport according to the respective aspects of the present invention, the recording material can be transported for scanning at a constant speed in a sufficiently uniform and correct fashion to achieve satisfactory image recording without causing any unevenness in image quality. It has heretofore been difficult for image recording apparatus to produce satisfactory image by adopting raster scanning using the conventional screw transmission mechanism but the transporting apparatus of the-present invention is capable of achieving satisfactory image recording even if it is applied to such raster scanning recording apparatus and the image produced has no unevenness in color or density that appears as stripes.

The transporting apparatus of the present invention is described below with reference to the preferred embodiments shown in the accompanying drawings.

Figure 1B:
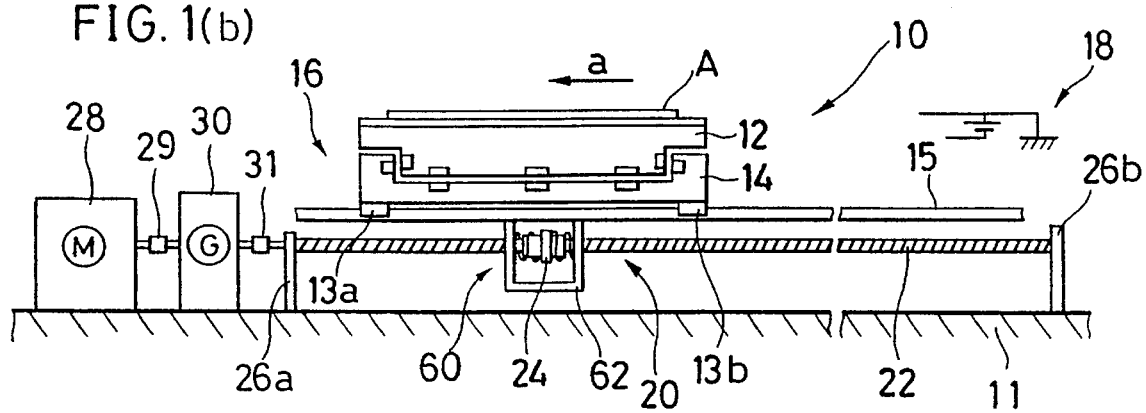

FIG. 1a is a diagrammatic cross section that shows, from the front, one phase of the use of an embodiment of the transporting apparatus according to the second aspect of the present invention, and FIG. 1b shows a different phase of its use.

The transporting apparatus according to the first aspect of the present invention is essentially the same in construction as the transporting apparatus of the second aspect shown in FIGS. 1a and 1b, except that the recording material is not fixed by electrostatic attraction and, hence, the following description is chiefly directed to the transporting apparatus according to the second aspect.

Figure 4:
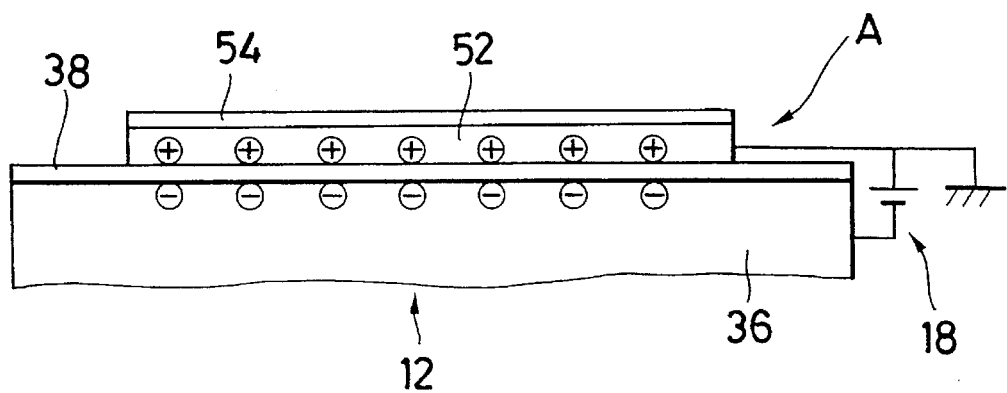
FIG. 4 is a diagram showing conceptually a recording material as it is fixed in the transporting apparatus shown in FIG. 1.

The transporting apparatus for scanning exposure (hereunder referred to simply as the "transporting apparatus") generally indicated by 10 in FIG. 1a transports the recording material A in a predetermined scan direction, with the recording material A having a recording layer 54 on an electroconductive base 52 (see FIG. 4). The transporting apparatus comprises an exposure mount 16 composed of a platen 12 and transport plate 14, a power supply 18 for electrostatic attraction of the recording material A onto the platen 12, a screw transmission mechanism 20 that moves the exposure mount 16 in the direction of arrow a (or in reverse direction), and an engaging means 60 for engaging the screw transmission mechanism 20 and the transport plate 14.

When the transporting apparatus 10 is applied to an image recording apparatus that adopts raster scanning, image recording is performed by the following procedure: a light beam is scanned at fast speed by a suitable optical system (not shown) in the direction of main scanning which is normal to the paper of FIG. 1a while, at the same time, the exposure mount 16 is moved in the direction of arrow a (or reversely) as shown in FIG. 1b, thereby transporting the recording material A for sub-scanning at slow speed; in this way, the light beam is scanned two-dimentionally over the entire surface of the recording material A to perform image recording (exposure).

If the transporting apparatus 10 is to be applied to an image recording apparatus that adopts slit scanning, image recording is performed by the following procedure: an optical system (not shown) having a slit light source whose longitudinal axis runs normal to the paper of FIG. 1a is provided above the exposure mount 16, which is moved in the direction of arrow a (or reversely), whereby the recording light from the optical system is scanned over the entire surface of the recording material A to perform image recording (exposure).

The transporting apparatus 10 according to the second aspect of the present invention fixes the recording material A onto the platen 12 by electrostatic attraction. Hence, except for the base 52 which must be electroconductive, there is no particular limitation on the recording material A that can be used and it may be selected from among various known light-sensitive materials. The base 52 may also be formed of any electroconductive materials that can be used to make the base 52 of the recording material A, as exemplified by aluminum, carbon-containing polyethylene and films coated with a metal by evaporation. If desired, the recording material A to be used in the second aspect of the present invention may have an insulating layer on the back side of the base 52.

It should also be noted that there are no limitations at all on the recording material that can be used in the transporting apparatus according to the first aspect of the present invention and all known types of recording materials are applicable irrespective of whether the support is conductive or not.

In the transporting apparatus 10, the screw transmission mechanism 20 is composed basically of a drive screw (hereinafter sometimes referred to as "screw shaft") 22, a travelling nut (hereinafter sometimes referred to as "nut") 24 that engages threadably with the screw shaft 22, as well as drive source 28 and a speed reducer 30 that compose a drive system for the screw transmission mechanism 20 which is coupled to the left end of the screw shaft 22 as viewed in FIG. 1. The rotational driving force created by the drive source 28 such as a motor is transmitted via a coupling 29 to the reducer 30 which reduces the rotational speed to a predetermined lower value; the force is further transmitted via a coupling 31 to the screw shaft 22, which is then rotated at a predetermined speed.

The drive source 28 that can be used in the transporting apparatus of the present invention is not limited in any particular way and all known types including a motor with a brush and a brushless motor are applicable. Various types of servo motor are used with particular advantage. The speed reducer 30 also is not limited in any particular way and all known types are applicable.

The screw shaft 22 connected to the drive system described above has its left end supported rotatably on a column 26a and has its right end supported rotatably on a column 26b so that it is rotated at a predetermined speed. Both columns 26a and 26b are mounted on a platform 11.

The screw shaft 22 that can be used in the transporting apparatus 10 of the present invention is not limited in any particular way and all types of screw shafts such as a ball screw and a sliding screw that are used in known screw transmission mechanisms are applicable.

The nut 24 engages threadably with the screw shaft 22. In a preferred embodiment of the transporting apparatus 10 shown in FIG. 1, the nut 24 is brought into engagement with the exposure mount 16 (or transport plate 14) by the engaging means 60 of a predetermined composition that uses urging members such as springs, as will be described below in greater detail. The nut 24 that can be used in the present invention is not limited in any particular way as long as it matches the screw shaft 22, and all types of nuts such as a ball screw nut and a sliding screw nut that are used in known screw transmission mechanisms are applicable without any limitations.

The exposure mount 16 is composed of the transport plate 14 in engagement with the screw transmission mechanism 20 and the platen 12 which is held on the transport plate 14 and which fixes the recording material A by electrostatic attraction, with the platen 12 being supported in such a way that it is displaceable relative to the transport plate 14. In a preferred embodiment of the transporting apparatus 10 shown in FIG. 1, the platen 12 is held in a contactless fashion with respect to the transport 14 by being kept afloat magnetically.

The transport plate 14 is fitted with carriages 13a and 13b that engage guide rails 15 that are supported by suitable support members (not shown). The carriages 13a and 13b contain bearings, rollers and other elements that insure a smooth movement of the transport plate 14 (or exposure mount 16).

Figure 2:
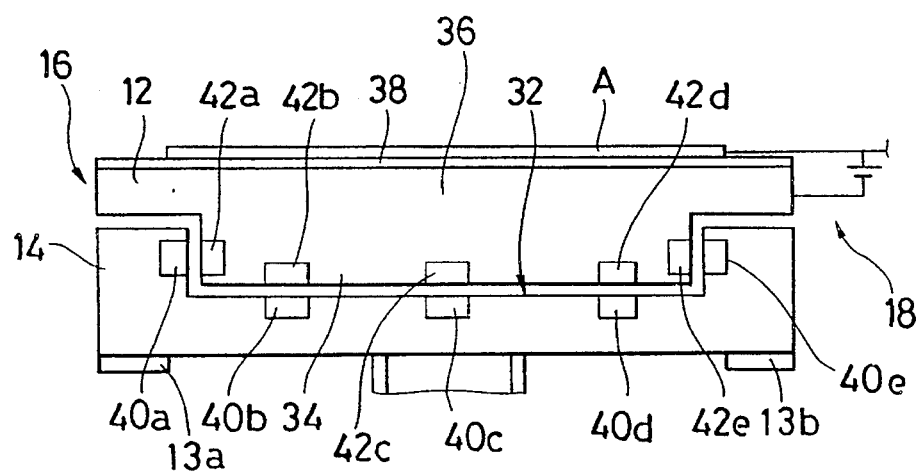
FIG. 2 is a partial enlarged view of the exposure mount in the transporting apparatus shown in FIG. 1.

FIG. 2 is a partial enlarged view that shows the exposure mount 16 diagrammatically. The transport plate 14 is shaped like a box having a hollow portion 32. The transport plate 14 holds the platen 12 by accommodating in the hollow portion 32 a projection 34 formed on the underside of the platen 12 to be described below.

As already mentioned, a preferred embodiment of the transporting apparatus 10 shown in FIG. 1 is such that the exposure mount 16 (i.e., the transport plate 14) engages the nut 24 of the screw transmission mechanism 20 by the engaging means 60 which comprises urging members and pressing members.

Figure 3:
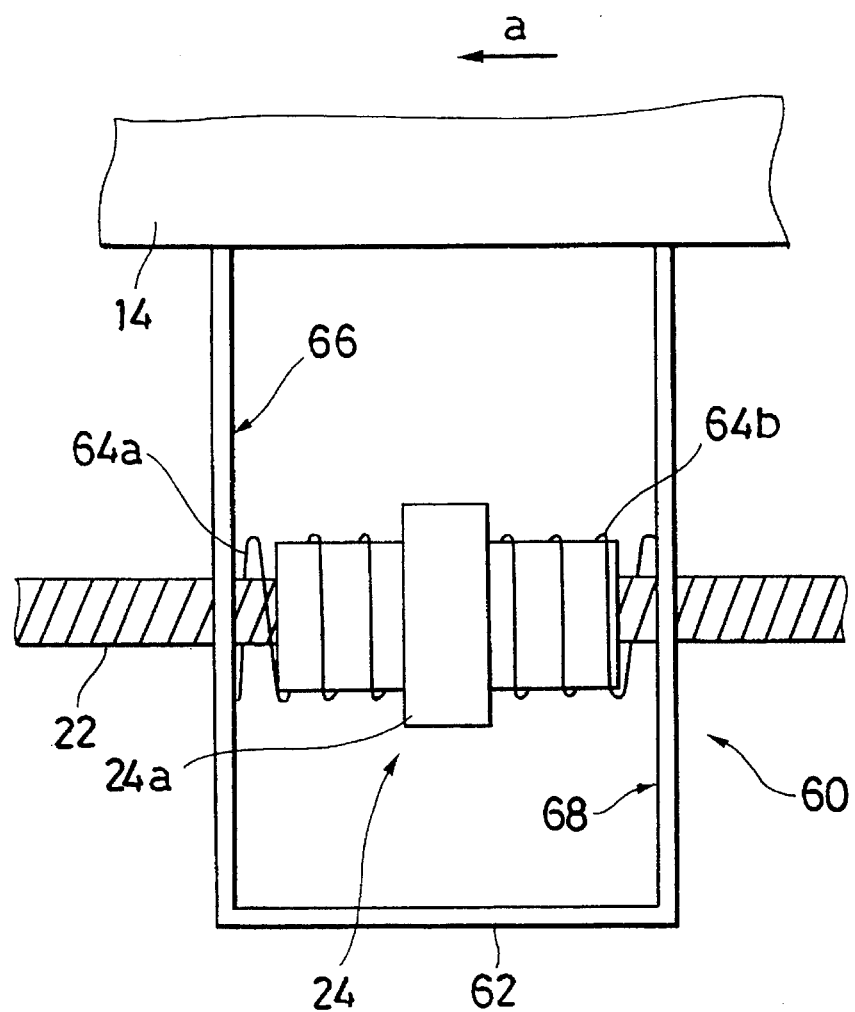
FIG. 3 is a diagrammatic view showing conceptually a means of achieving engagement between the screw transmission mechanism and the transport plate in the transporting apparatus shown in FIG. 1.

FIG. 3 is a diagrammatic view of the engaging means 60 which is provided on the underside of the transport plate 14. The engaging means 60 shown in FIG. 3 is identical to the engaging means disclosed by the present inventor in commonly assigned Japanese Patent Application No. 86998/1991 and it is capable of fully suppressing or advantageously preventing the various types of vibrations and erratic movement of the exposure mount 16 that originate from the screw transmission mechanism 20 which is a means of moving the exposure mount 16.

In the transporting apparatus 10 shown in FIGS. 1 and 3, the engaging means 60 is composed of a housing 62 and springs 64a and 64b which are urging members. The housing 62 is fixed to the underside of the transport plate 14 in such a way that it crosses over the nut 24 parallel to the direction of movement (indicated by arrow a) by means of side walls 66 and 68 (the term "cross over" as used hereinafter should be referenced to the direction parallel to arrow a). Thus, in the transporting apparatus shown in FIGS. 1 and 3, the side walls 66 and 68 of the housing 62 work as pressing members, or supporting members that support the nut 24 via springs 64a and 64b.

As already mentioned, the nut 24 is allowed to move in the direction of arrow a as a result of the rotation of the screw shaft 22, and it has a flange 24a formed in the central part as taken in the direction of movement.

A spring is provided between the nut 24 and each of the side walls 66 and 68 that cross over the nut. Spring 64a engages with the flange 24a and the side wall 66 whereas spring 64b engages with the flange 24a and the side wall 68. The two springs urge and press the nut 24 from opposite sides.

Stated more specifically, the engaging means 60 shown in FIG. 3 has side walls 66 and 68 provided as pressing members in positions that cross over the nut 24, with spring 64a being placed in engagement with the nut 24 and the side wall 66 and spring 64b in engagement with the nut 24 and the side wall 68, so that the two springs urge the nut 24 from opposite sides in the direction of movement, whereby the nut 24 is brought into engagement with the housing 62, or the transport plate 14.

A vibration system composed of an urging member such as springs and weights (material particles) is unable to follow vibrations at higher frequencies than the resonant frequency of its own. In other words, if a vibration applied externally to the urging member has a higher frequency than the resonant frequency of the vibration system, it will not be transmitted to the weight but is rapidly damped by the urging member.

This phenomenon is utilized by the engaging means 60 which is used in the transporting apparatus 10 of the present invention and the nut 24 is not directly coupled to the transport plate 14 (or the housing 62) but they are coupled together with the urging force exerted by the springs 64a and 64b. Stated more specifically, in the engaging means 60 shown in FIG. 3, the transport plate 14 combines with the springs 64a and 64b to form a vibration system composed of urging members and a weight, so that the transport plate 14 is coupled to the nut 24 via the two springs; because of this arrangement, vibrations that originate from the drive system for the screw transmission mechanism 20 and which oscillate at frequencies higher than the resonant frequency of the vibration system, as exemplified by erratic rotation of the motor or the screw shaft 22 or the resulting vibrations, are effectively absorbed between the springs and the housing 62 without being transmitted to the transport plate 14, thereby enabling the recording material A to be transported for scanning in a uniform and correct manner.

Hence, by using the engaging means 60 in the transporting apparatus 10 to couple the screw transmission mechanism 20 to the exposure mount 16, satisfactory image recording can be accomplished to produce an image that is substantially free from unevenness in color or density in the sub-scanning direction even if the present invention is applied to image recording by a raster scanning method which has heretofore involved considerable difficulties in achieving satisfactory image formation.

A few more words seem necessary to make theoretical discussion of vibrations. In the transporting apparatus 10 which uses a screw transmission mechanism, vibrations that originate from erratic rotation of the drive source 28 is the greatest cause of vibrations that are transmitted from the drive system and the frequency of this erratic rotation depends on the rotating frequency (rotating speed) of the drive source 28. The transporting apparatus 10 of the present invention is capable of damping vibrations at higher frequencies than the resonant frequency of the vibration system composed of the transport plate 14 (the exposure mount 16) and the springs 64a and 64b and, hence, erratic movement of the exposure mount 16 can be markedly suppressed by insuring that the resonant frequency of the vibration system is lower than the rotating frequency of the drive source 28. In addition, the resonant frequency of the vibration system can be made different from the rotating frequency of the drive source 28, so there will be no chance of the exposure mount 16 (transport plate 14) to resonate as a result of superposition of the two frequencies.

The resonant frequency, fr, of the vibration system composed of the exposure mount 16 and the springs 64a and 64b is expressed by the following equation:

$$fr[Hz] = (1/2\pi)(k/m)^{1/2}$$

where m is the mass of the exposure mount and k is the composite spring constant of the springs. Therefore, if the rotating frequency of the drive source 28 is $f_M$ Hz [rotating speed: $r_M$ (=60 $f_M$) rpm], one need insure that the resonant frequency of the vibration system, fr, is less than $f_M$. In other words, by selecting an appropriate value of the spring constant k for each of the springs 64a and 64b in association with the mass m of the exposure mount 16, one can satisfy the condition of fr<$f_M$ and, accordingly, vibrations originating from the drive source 28, particularly those which cause erratic transport in the sub-scanning direction (the direction of movement of the exposure mount 16), can be effectively absorbed.

The urging means that can be used in the present invention is in no way limited to the springs 64a and 64b shown in FIG. 3 and they may be replaced by pneumatic springs, rubber, etc.

The springs 64a and 64b may have the same or different spring constants as long as they are capable of realizing a desired resonant frequency in the vibration system under consideration.

Still more, in the transporting apparatus of the present invention, the engaging means for engaging the screw transmission mechanism 20 and the transport plate 14 is no way limited to the engaging means 60 and the engaging means 80 described after may be used, besides, the nut 24 of the screw transmission mechanism 20 may be secured to the transport plate 14 or its housing 62 by bolting, welding or some other suitable method.

In the transporting apparatus 10 shown in FIGS. 1 and 2, the platen 12 held on the transport plate 14 has an insulating layer 38 on a support 36 formed of an electroconductive material. As mentioned hereinabove with reference to FIG. 2, the platen 12 has the projection 34 formed on the underside in such a way that it is nested in the hollow portion 32 of the transport plate 14.

The electroconductive material of which the support 36 is formed is in no way limited and any known conductive materials including aluminum and stainless steel are applicable.

The transporting apparatus 10 is in no way limited to one in which the support 36 is wholly made of a conductive material; if desired, a conductive layer may be provided on an insulating material to form a base, which is overlaid with the insulating layer 38 in such a way that the conductive layer is connectable to the power supply 18. Alternatively, only that area of the base which corresponds to the placement of the recording material A may be formed of a conductive material.

In the transporting apparatus 10 shown in FIG. 2, the insulating layer 38 is formed on top of the platen 12. The insulating material of which the insulating layer 38 can be formed is in no way limited and any known insulating materials are applicable. Specifically, PET (polyethylene terephthalate), fluorine resins and polypropylene may advantageously be enumerated. The thickness of the insulating layer 38 also is not limited in any particular way and values that insure positive insulation between the platen 12 and the recording material A (base 52) may be properly selected in accordance with the insulating material that forms the insulating layer 38.

The insulating layer 38 may be fixed to the top surface of the platen 12 or it may be detachably provided on the platen 12. The detachable provision of the insulating layer 38 offers the advantage that the platen 12 is applicable not only to a light-sensitive material that does not have an insulating layer on the back side as in the case of recording material A shown in FIG. 4 but also to a recording material that has an insulating layer on the back side.

The method for rendering the insulating layer 38 to be detachable from the platen 12 is in no way limited and various known methods are applicable, including the use of various jigs, the formation of a recess in the platen 12 and a nestable projection on the insulating layer 38, and the use of magnets.

If the recording material to be scanned already has an insulating layer on the back side, the insulating layer 38 need not be formed on the platen 12.

In the transporting apparatus 10 according to the second aspect of the present invention, the platen 12 fixes the recording material A by electrostatic attraction. Before the transport of the recording material A starts, namely, in the state where the exposure mount 16 is in the home position shown in FIG. 1a, voltage is applied from the power supply 18 to both the recording material A and the support 36 of the platen 12, whereby the recording material A is sucked electrostatically to the platen 12.

FIG. 4 shows conceptually how the recording material A is fixed onto the platen 12 by electrostatic attraction. As just mentioned above, the power supply 18 applies voltage to both the support 36 of the platen 12 and the base 52 of the recording material A. In the transporting apparatus 10 shown in FIG. 4, the insulating layer 38 is formed between the conductive base and base 52, so the platen 12 and the base 52 will be electrically charged according to the polarity of the electrodes to which they are connected and, hence, in the case shown, the base 52 of the recording material A is charged positively whereas the support 36 of the platen 12 is charged negatively. As a consequence, the base 52 and the support 36 attract each other electrostatically so that the recording material A is fixed onto the platen 12 (insulating layer 38).

Once the recording material A has been attracted in the transporting apparatus 10, it will be kept fixed in position even in the absence of applied voltage unless the circuit between the platen 12 and the base 52 is shorted. Therefore, even if the exposure mount 16 moves so that the power supply 18 is disconnected from the support 36 and the support 50 as shown in FIG. 1b, the recording material A can be held advantageously fixed onto the platen 12 by electrostatic attraction and this enables the exposure mount 16 (and hence platen 12) to move correctly without connecting the power supply to the platen 12 by an electrical cord or providing a power supply on the platen 12.

The recording material A can be released from the platen 12 by shorting the circuit between the platen 12 and the base 52 through a switch or some other suitable means.

The voltage to be applied from the power supply 18 is in no way limited and any values will do as long as a satisfactory force of electrostatic attraction is generated in accordance with various factors such as the curl or the tendency-to-bend of the recording material A used and the thickness of the insulating layer 38. However, it is at least necessary to correct the curl and the tendency-to-bend of the recording material A in such a way that it will not exceed the depth of focus of the recording light.

Fixing the recording material A onto the platen 12 by electrostatic attraction has the advantage of eliminating the need to provide a suction means such as a suction pump for fixing the recording material by suction or a suction hose for connecting the suction pump to the exposure mount. If a suction hose were dragged over the base during the movement of the exposure mount or if the hose contacted various members on the base, there would occur variations in load or vibrations (vibrations can also take place in the suction means itself), causing unevenness in the speed of movement of the exposure mount or vibrations. However, these problems are absent if the recording material is fixed onto the platen 12 by electrostatic attraction and it can be transported for scanning in a more correct way.

In the transporting apparatus according to the first aspect of the present invention, the recording material is not fixed onto the platen by electrostatic attraction, so there are no limitations at all on such factors as the material of which the platen (base) is to be made and the presence or absence of the insulating layer and, in this regard, the transporting apparatus may be the same as the prior art version.

The method of fixing the recording material onto the platen also is not limited in the first aspect of the present invention and any known various methods may be adopted including the application of suction, the use of magnets and the use of various jigs. However, if suction is applied as a fixing method, it is impossible to avoid the above-described adverse effects of a suction hose and, therefore, it is preferred to adopt a method, such as the use of magnets or jigs, that is capable of fixing the recording material in such a way that the platen will not contact any other members.

As already mentioned, the exposure mount 16 is composed of the transport plate 14 which retains the platen 12 by having the projecting part 34 of the platen 12 nested in the hollow portion 32 of the transport plate 14 (see FIG. 2). In the transporting apparatus 10 of the present invention, the platen 12 is to be retained on the transport plate 14 in a non-contact manner and, in the case shown, this is achieved by magnetic levitation of the platen 12.

In the transporting apparatus 10, magnets 40a, 40b, 40c, 40d and 40e are provided in the hollow portion 32 of the transport plate 14 whereas magnets 42a, 42b, 42c, 42d and 42e are provided in the projecting part 34 of the platen 12 in such a way that they face and repel the corresponding magnets 40a, 40b, 40c, 40d and 40e. As already mentioned, the platen 12 is retained on the transport plate 14 with the projection 34 being nested in the hollow portion 32 of the transport plate 14. However, even if the projection 34 is nested in the hollow portion 32, the magnets facing each other create a sufficient repelling force to make the platen 12 afloat, whereby the platen 12 is carried on the transport plate 14 without contacting it.

The magnets 40a–40e and their counterparts 42a–42e act in such a way that they cause the platen 12 to be afloat above the transport plate 14, thereby supporting the platen 12 without making contact with the plate 14. Stated more specifically, magnets, 40b, 40c and 40d and their counterparts 42b, 42c and 42d support the platen 12 in such a way that the bottom face of the projection 34 is afloat above the bottom of the hollow portion 32 of the transport plate 14, thereby working to absorb vibrations oscillating up and down as viewed in FIGS. 1 and 2 (i.e., in the vertical direction), whereas magnets 40a and 40e and their counterparts 42a and 42e support the platen 12 in such a way that the side wall of the projection 34 will not contact the side wall of the hollow portion 32 of the transport plate 14, thereby working to absorb vibrations oscillating toward the left as viewed in FIGS. 1 and 2 (i.e., in the direction of transport for sub-scanning).

Thus, one may well say that the magnets 40a and 40e combine with the magnets 42a and 42e to function as a spring interposed between the platen 12 and the transport plate 14. If the equivalent spring constant for the space between the magnets 40a and 42a and for the space between magnets 40e and 42e is written as $k_e$ whereas the mass of the platen 12 is written as $m_p$, the resonant frequency, $f_{re}$, of the vibration system composed of the platen 12 and magnets 40a, 40e, 42a and 42e is expressed by:

$$f_{re} = (1/2\pi)(k_e/m_p)^{1/2} \text{ Hz}$$

which is the same as in the case of the above discussed engaging means. Hence, by appropriately selecting the magnetic strength of the magnets 40a, 40e, 42a and 42e to set the equivalent spring constant $k_e$ at an appropriate value, the resonant frequency $f_{re}$ (Hz) can be made lower than the rotating frequency $f_M$ (Hz) of the drive source 28 such as a motor so that vibrations originating from the drive source 28 are effectively absorbed. In other words, the vibration system composed of the platen 12 and magnets 40a, 40e, 42a and 42e may well be regarded as a vibration filter whose cutoff frequency is equal to $f_{re}$ (resonant frequency). Needless to say, the combination of magnets 40b–40d and magnets 42b–42d can also be designed to work as a vibration filter.

In the case where the platen 12 combines with magnets 40a, 40e, 42a and 42e to compose a vibration filter, the exposure mount 16 and the screw transmission mechanism 20 in the transporting apparatus 10 have no need to rely upon the associated engaging means to absorb vibrations originating from the drive system. Hence, there is no need to use engaging means 60 that serves as a vibration filter and, instead, a fixedly engaging means 80 to be described hereinafter may be used. If desired, the exposure mount 16 and the transmission mechanism 20 may be fixed in such a way that they form a completely integral assembly.

Consequently, even if the transport plate 14 is vibrated by externally applied forces such as the vibration of the screw transmission mechanism 20, variations in load due to unevenness in the friction between each of carriages 13a and 13b and guide rails 15, impacts that develop when the exposure mount rides over the seams of the guide rails 15, externally applied vibrations, and vibrations that develop when bearings, rollers, etc. in the carriages 13a and 13b rotate or roll, such vibrations will be effectively absorbed between the transport plate 14 and the platen 12 without being transmitted to the platen 12 where the recording material A is fixed in position.

Further, as already mentioned, the transporting apparatus 10 according to the second aspect of the present invention has the recording material A fixed on the platen by electrostatic attraction without using any suction means such as a suction hose and, hence, the platen 12 can be held in such a way that it will not contact any other member.

By virtue of the various features already described above, such as the ability of the engaging means 60 to absorb erratic rotation of the motor, etc. and the absence of any adverse effects that would be caused if a suction hose contacted the base or other components, the transporting apparatus 10 of the present invention insures that the platen holding the recording material A will move with an extremely high precision without experiencing any unevenness in speed due to vibrations, etc., thereby permitting the recording material A to be transported for scanning with and extremely high precision.

Therefore, by applying the transporting apparatus of the present invention to various types of image recording apparatus, one can accomplish highly precise and satisfactory image recording without any unevenness in image quality.

The magnets that can be used in the present invention are not limited to any particular types and various permanent magnets and electromagnets may be used as long as they permit the platen 12 to be afloat by magnetic levitation so that it will not contact the transport plate 14.

The number and layout of the magnets 40 and 42 are also without limitation and their numbers and positions may be properly set in accordance with the their magnetic force, the weight of the platen, its size, etc. Further, the magnets 40 and 42 are not limited to those which repel each other; if each of the magnets 40 and 42 consists of a plurality of small magnets that are placed in such a way that the small magnets 40 face the small magnets 42, part of them may be composed of attracting magnets so as to adjust the distance between the platen 12 and the transport plate 14, as well as the capability of the combination of the platen 12 with magnets as vibration filter.

The method for assuring non-contact between the platen 12 and the transport plate 14 is in no way limited to the use of magnets as shown in FIG. 2 and, if there is no particular need to have the combination of the platen 12 with magnets 40b, 40c, 40d, 42b, 42c and 42d function as a vibration filter, the hollow portion 32 of the transport plate 14 may be filled with a suitable fluid that permits the platen 12 to be afloat. Various other methods may of course be adopted. The foregoing description assumes that the platen 12 is separated from the transport 14 by an actually empty space. If desired, a low-friction material such as Teflon may be provided or a lubricant may be coated in the area of contact between the platen 12 and the transport 14, or alternatively, a number of small balls, rollers (radial balls), needles, etc. of the same radius may be interposed between the platen 12 and the transport plate 14, so that the two members are capable of independent or relative displacement (by small amounts), thereby insuring that the force of friction between the platen 12 and the transport plate 14 will be smaller than the inertial force due to erratic transport that is exerted upon the exposure mount (including the one having a vibration system as will be described hereinafter). These and various other methods are applicable depending on the case.

The transporting apparatus 10 shown in FIG. 1 is of such a construction that the platen 12 is retained on the transport plate 14 by having the projecting part 34 of the platen 12 nested in the hollow portion 32 of the transport plate 14. However, this is not the sole case of the present invention and various other constructions may be adopted as long as they permit the platen to be held in a movable manner by the transport plate which engages the screw transmission means, and they include a method of providing a hollow portion in the platen while providing a projection on the transport plate, and a method of providing a hollow portion in either one of the platen and the transport plate and nesting the other in the hollow portion.

Figure 5A:
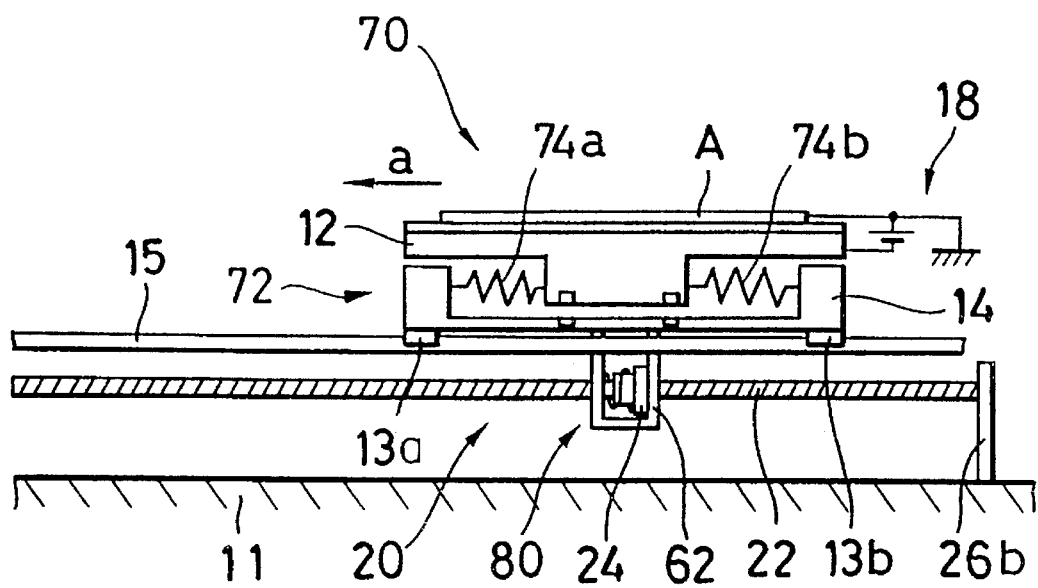
FIGS. 5a and 5b are diagrammatic views that show conceptually two different phases of the use of a transporting apparatus according to another embodiment of the present invention.
Figure 5B:
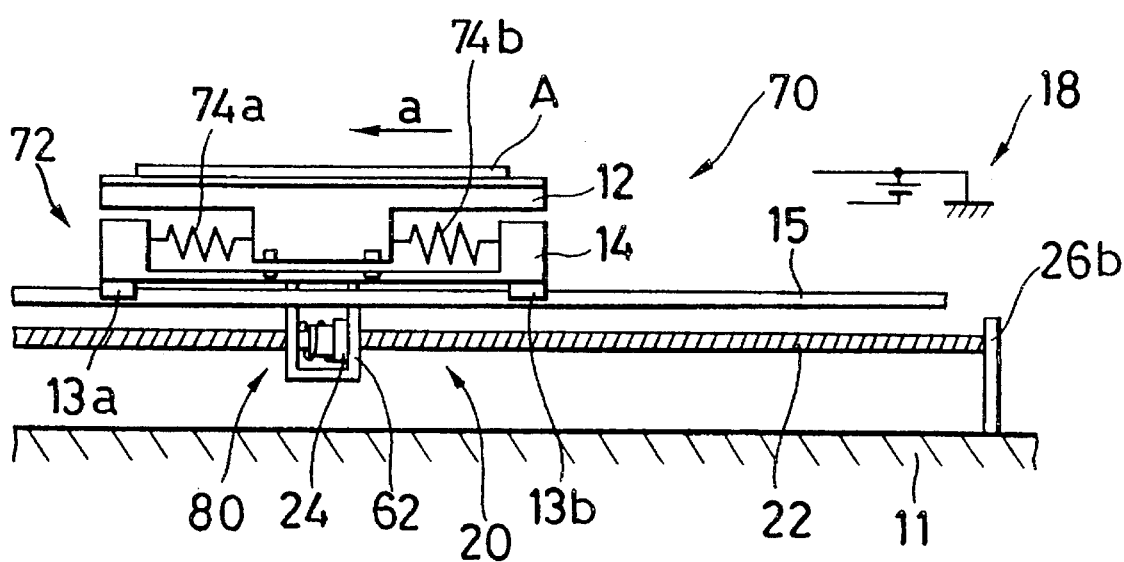

FIG. 5a is a diagrammatic cross section that shows, from the front, one phase of the use of an embodiment of the transporting apparatus according to the fourth aspect of the present invention, and FIG. 5b shows a different phase of its use. The transporting apparatus according to the fourth aspect which is generally indicated by 70 in FIGS. 5a and 5b has essentially the same construction as the transporting apparatus 10 according to the second aspect which is shown in FIGS. 1a and 1b, except that the magnets 40a and 42a as well as magnets 40e and 42e provided between the platen 12 and the transport plate 14 which are the two major components of the exposure mount 16 are replaced by urging members 74a and 74b to compose a vibration filter and except for the use of an engaging means 80. Hence, the components which are the same as those used in the transporting apparatus 10 are identified by like numerals and will not be described in detail.

The transporting apparatus according to the third aspect of the present invention is essentially the same in construction as the transporting apparatus of the fourth aspect shown in FIGS. 5a and 5b, except that the recording material is not fixed by electrostatic attraction and, hence, the following description is chiefly directed to the transporting apparatus according to the fourth aspect as in the case of the previous description of the first and second aspects.

The transporting apparatus for scanning exposure (hereunder referred to simply as the "transporting apparatus") generally indicated by 70 in FIG. 5a transports the recording material A in a predetermined scan direction, with the recording material A having a recording layer 54 on an electroconductive base 52 (see FIG. 4). The transporting apparatus comprises a screw transmission mechanism 20 composing a drive source unit, an exposure mount 72 composed of a platen 12 on which the recording material is fixed in position and a transport plate 14 that holds the platen 12 and which engages the screw transmission mechanism 20, a power supply 18 for electrostatic attraction of the recording material A onto the platen 12, and and engaging means 80 for engaging the screw transmission mechanism 20 and the transport plate 14. As shown in FIG. 5b, the screw transmission mechanism 20 moves the transport plate 14 (or exposure mount 72) in the direction of arrow a (or in reverse direction), thereby transporting the recording material A for scanning.

As is clear from FIG. 5a, the exposure mount 72 in the transporting apparatus 170 according to the fourth aspect is also composed of the platen 12 and the transport plate 14 which engages with the screw transmission mechanism 20.

As in the exposure mount 16 according to the second aspect which is shown in FIG. 1a, the transport plate 14 retains the platen 12 in a relatively displaceable manner, with the recording material A being fixed in position on the platen 12.

Figure 6:
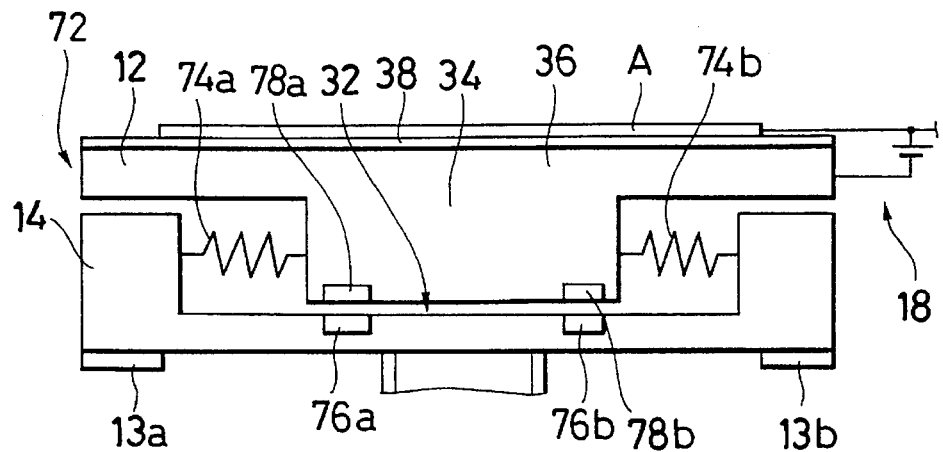
FIG. 6 is a diagrammatic view showing conceptually a means of achieving engagement between the screw transmission mechanism and the transport plate in the transporting apparatus shown in FIG. 5.

However, the transporting apparatus 70 shown in FIGS. 5(a) and (b) differs from the transporting apparatus of the second aspect in the following points: the transport plate 14 of the exposure mount 72 is brought into engagement with the screw transmission mechanism by the engaging means 80 and, as shown in FIG. 6, the transport plate 14 is coupled to the platen 12 by springs 74a and 74b (urging members), which combine with the platen 12 to compose a vibration filter. In a preferred embodiment, the platen 12 may be rendered afloat by magnetic levitation so that it is retained on the transport plate 14 without contacting the latter except for the springs 74a and 74b.

Figure 7:
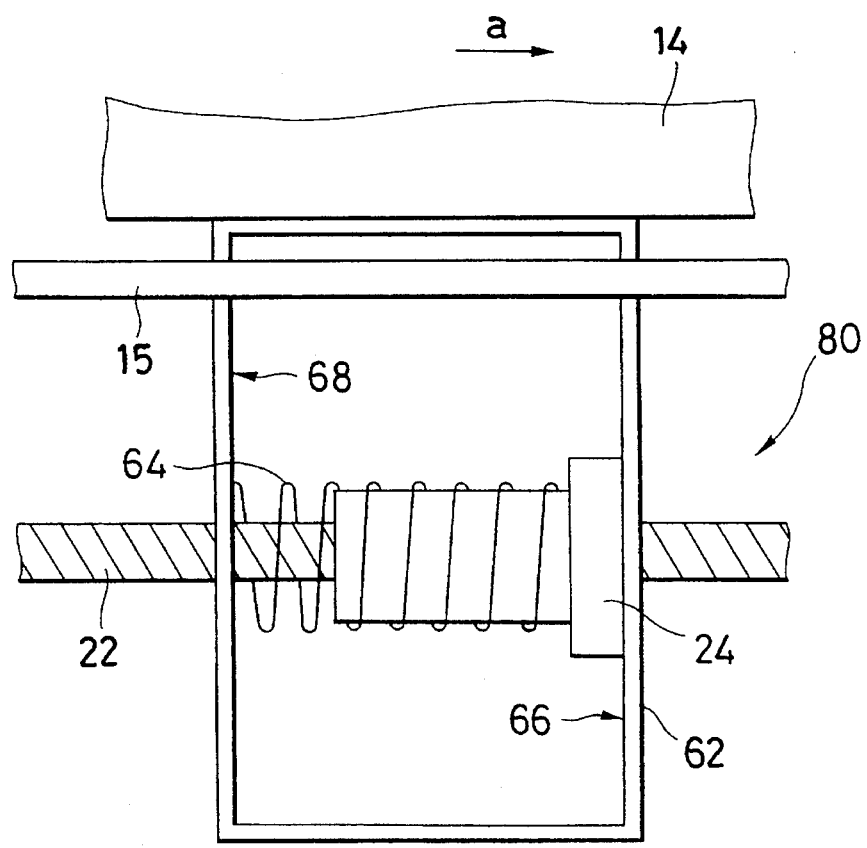
FIG. 7 is a partial enlarged view of the exposure mount in the transporting apparatus shown in FIG. 5.

The engaging means 80 for establishing engagement between the transport plate 14 and the screw transmission mechanism 20 is shown enlarged in FIG. 7. As shown, a housing 62 is secured to the underside of the transport plate 14. The nut 24 of the screw transmission mechanism 20 is provided within the housing 62 and a spring 64 is interposed between the nut and one inner side wall 66 of the housing 62. Thus, in the transporting apparatus shown, the nut 24 is pressed against the other inner side wall 68 of the housing 62 by means of the spring 64, so that the nut 24 is coupled fixedly to the transport plate 14.

This arrangement has the advantage of facilitating the compensation for errors in the means 80 of engagement between the transport plate 14 and the screw transmission mechanism 20 or deflection of the screw shaft 22.

The means for engaging the screw transmission mechanism 20 and the transport plate 14 in the transporting apparatus according to the fourth aspect of the present invention is by no means limited to the engaging means 80 and it may be replaced by the engaging means 60 shown in FIG. 3. If desired, the nut 24 of the screw transmission mechanism 20 may be secured to the transport plate 14 or its housing 62 by bolting, welding or some other suitable method.

FIG. 6 is a partial enlarged view that shows diagrammatically the exposure mount 72 which is composed of the platen 12 and the transport plate 14. The transport plate 14 is shaped like a box having a hollow portion 32 whereas the platen 12 has a projection 34 on the underside. The exposure mount 72 in the transporting apparatus 70 shown in FIG. 5 is such that the projecting part 34 of the platen 12 is nested in the hollow portion 32 of the transport plate 14, whereby the platen 12 is retained on the transport plate 14. In the case shown, the springs 74a and 74b permit the projecting part 34 of the platen 12 to be coupled to the inner surfaces of the hollow portion 32 of the transport plate 14 in the direction of transport for scanning.

As already mentioned, a vibration system composed of urging members and weights (material particles) can compose a vibration filter that is unable to follow vibrations at higher frequencies than the resonant frequency of its own. In other words, if a vibration applied externally to the urging member has a higher frequency than the resonant frequency of the vibration system, it will not be transmitted to the weight but is rapidly damped by the urging member.

This phenomenon is utilized by the transporting apparatus 70 of the present invention. The exposure mount that is to fix the recording material A in position and which is to engage the drive unit is conventionally formed as an integral assembly; but in the transporting apparatus 70 of the present invention, the exposure mount is composed of the platen 12 for fixing the recording material A in position and the transport plate 14 which is to engage the screw transmission mechanism 20 and which holds the platen 12, with the two components being connected by springs 74a and 74b which are urging members. Thus, the platen 12, the transport plate 14 and the springs 74a and 74b combine in such a way that a vibration system, or a vibration filter, composed of urging members and a weight, is formed in the portions where the platen 12 is coupled to the transport plate 14.

Consequently, vibrations oscillating at higher frequencies than the resonant frequency of the vibration system can be effectively damped; if, in a preferred embodiment, the resonant frequency (cutoff frequency) is set at a value less than the rotating frequency of the motor for the screw transmission mechanism 20, all vibrations that oscillate at lower frequencies than the resonant frequency including not only vibrations that originate from erratic rotation of the motor and the screw shaft 22 or eccentricity of the shaft but also externally applied vibrations such as impacts that develop when the exposure mount rides over the seams of the guide rails 15 and vibrations due to the rotation and rolling of the bearings and rollers in the carriages 13a and 13b, are effectively absorbed by the vibration system to eliminate any adverse effects that would be caused by those vibrations to the platen 12 thereby substantially reducing the erratic transport of the recording material A.

Another advantage of the construction described above is that unlike the engaging means 60 shown in FIG. 3, the engaging means 80 has no need to absorb erratic rotation of the motor and other forms of vibrations and, hence, the transport plate 14 and the screw transmission mechanism 20 can be engaged fixedly by the engaging means 80 as already mentioned above; alternatively, the two components may be fixed together into a rigid unitary structure by a suitable method such as bolting or welding. The transporting apparatus 70 of the fourth aspect under consideration offers the advantage that even if a fixed structure or a fixed engagement of the type just described above is used, it is possible to eliminate any adverse effects that would otherwise be caused by variations in the load of moving the transport plate 14 on account of uneven friction between plate 14 and the guide rails 15 (or carriages 13a and 13b) or by vibrations developing when the exposure mount rides over the seams of the guide rails 15.

Consequently, by using the transporting apparatus 70 of the present invention, satisfactory image recording can be accomplished to produce an image that is substantially free from unevenness in color or density in the sub-scanning direction even if the transporting apparatus is applied to image recording by a raster scanning method which has heretofore involved considerable difficulties in achieving satisfactory image recording.

The urging members that can be used in the present invention are by no means limited to the springs 74a and 74b shown in FIGS. 5 and 6 and various known urging members including coil springs and leaf springs are applicable. Even pneumatic springs and rubber will do.

The springs 74a and 74b may have the same or different spring constants as long as they are capable or realizing a desired resonant frequency in the vibration system under consideration.

The number of applicable urging members is not limited to the illustrated case of using two; if desired, only one urging member may be used or even three or more members may be used.

The urging members which are disposed in such a way as to cross over the projecting part 34 of the platen 12 in the direction of transport need not be equal in number and they may be disposed in different numbers as exemplified by the case where two urging members are disposed on the right side of the projecting part 34 as viewed in FIG. 6 whereas one urging member is provided on the left side. In addition, the layout of urging members is in no way limited to the case shown where they are provided on opposite sides of the projecting part 34; if desired, urging members may be provided on only one side of the projection part 34 to couple the platen 12 to the transport plate 14.

In the case shown, the vibration system is composed by providing springs 74a and 74b parallel to the direction of transport; however, the urging members may be provided in a direction perpendicular to that of transport or the two arrangements may be combined as long as urging force is created in the direction of transport.

In the case shown in FIGS. 5 and 6, the platen 12 is coupled to the transport plate 14 by means of only springs 74a and 74b which serve as urging members. However, this is not the sole case of the present invention and dampers or some other means may be added to compose the vibration system. If dampers are to be used, they are supported on either the platen 12 or the transport plate 14, preferably on the transport plate 14 alone, so as to form a certain gap from the other member.

Figure 8:
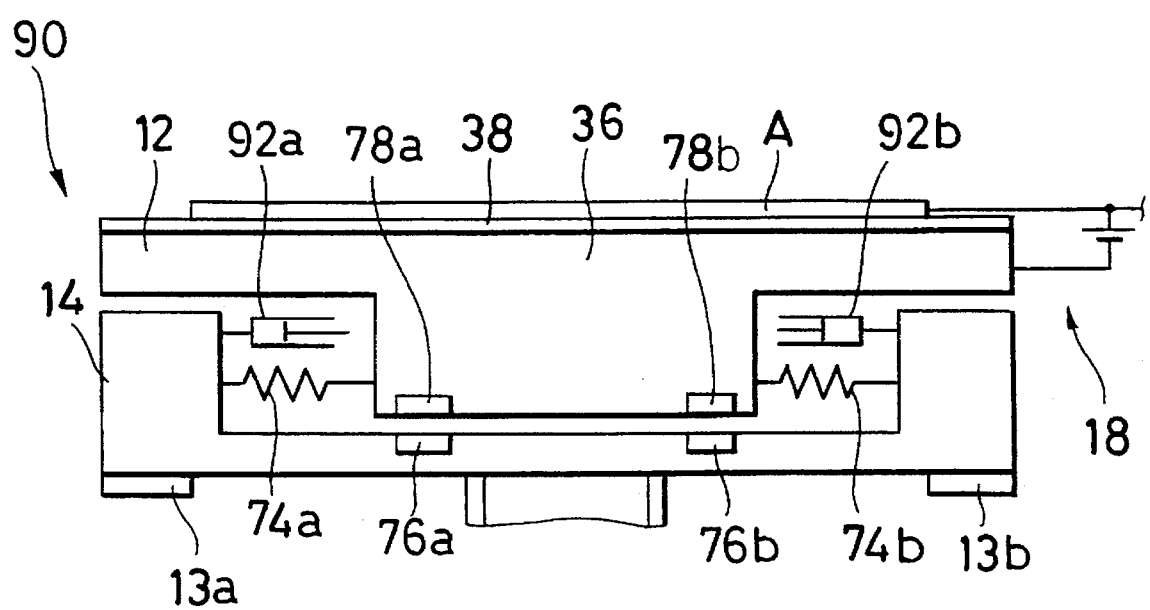
FIG. 8 is a sign enlarged view showing conceptually another example of the exposure mount in the transporting apparatus of the present invention.

FIG. 8 shows another example of the exposure mount which is generally indicated by 90 and in which the springs 74a and 74b as urging members are combined with dampers 92a and 92b to compose a vibration system, or a vibration filter. This arrangement has a particular advantage in that vibrations of the exposure mount that take place when a great inertial force is exerted on the platen 12 as in the case of start or stop of the transporting (moving) action of the transport plate 14, can be rapidly damped.

The dampers that can be used are in no way limited and any known dampers including air dampers and hydraulic dampers are applicable.

As described above, the transporting apparatus 70 of the present invention forms a vibration system composed of the platen 12, the transport plate 14 and the springs 74a and 74b and this vibration system effectively absorbs vibrations originating as from erratic rotation of the motor so that they will not be transmitted to the exposure mount 72 (or 90), thereby enabling the recording material A to be transported for scanning in a correct manner.

If a frictional force develops between the platen 12 and the transport plate 14 in the exposure mount 72, the vibration system will not work efficiently to achieve desired results. To avoid this possibility, the platen 12 is preferably supported by the transport plate 14 in such a way that they are substantially in a non-contact relationship.

As in the case shown in FIGS. 1 and 2, the transporting apparatus 70 shown in FIG. 6 uses magnetic force to keep the platen 12 afloat so that it will not contact the transport plate 14. Stated more specifically, magnets 78a and 78b are provided in the bottom face of the projecting part 34 of the platen 12 whereas magnets 76a and 76b that repel magnets 78a and 78b are provided in the areas of the hollow portion 32 of the transport plate 14 that face those magnets. The platen 12 is retained by the transport plate 14 as the projecting part 34 is nested in the hollow portion 32. Even if the projecting part 34 is nested in the hollow portion 32, the magnets provided in either one of them repel the magnets provided in the other, thereby keeping the platen 12 afloat; as a result, the platen 12 can be retained by the transport plate 14 without contacting it except for the springs 74a and 74b.

This arrangement is effective in maximizing the ability of the above-defined vibration system to absorb vibrations, thereby allowing the recording material A to be transported for scanning in a more correct way.

As already mentioned, the magnets that can be used in the present invention are not limited to any particular types and various permanent magnets and electromagnets may be used as long as they permit the platen 12 to be afloat by magnetic levitation so that it will not substantially contact the transport plate 14. Further, as in the case of magnets 40 and 42 shown in FIG. 2, the number and layout of the magnets 78a, 78b, 76a and 76b are also without limitation and their numbers and positions may be properly set in accordance with their magnetic force, the weight of the platen, its size, etc.

As in the first and second aspects of the present invention, not only the method of keeping the platen 12 and the transport plate 14 in a non-contact relationship but also the method of allowing them to be capable of independent or relative displacement (by small amounts) may be implemented in various ways and by any means as long as the force of friction acting between the platen 12 and the transport plate 14 can be made sufficiently smaller than the inertial force due to erratic transport that is exerted upon the vibration system provided on the exposure mount 72 or 90, so that vibrations such as erratic movement occurring to the transport plate 14 can be effectively absorbed by the vibration system without being transmitted to the platen 12 to insure that it can be smoothly transported in pace with the transport plate 14.

The transporting apparatus 70 according to the fourth aspect of the present invention is a preferred embodiment of the transporting apparatus according to the third aspect, in which the platen 12 of the exposure mount 72 fixes the recording material A in position by electrostatic attraction. For this reason, the platen 12 has the insulating layer 38 provided on top of the support 36 which is formed of a conductive material. This arrangement is also the same as what is adopted by the transporting apparatus according to the second aspect and, hence, need not be described in detail.

Fixing the recording material A onto the platen 12 by electrostatic attraction has the advantage of eliminating the need to provide a suction means such as a suction pump for fixing the recording material by suction or a suction hose for connecting the suction pump to the exposure mount, whereby the platen 12 can be held on the transport plate 14 without making contact with any components other than the urging members (i.e., springs 74a and 74b). As a result, the action of the vibration system formed between the platen 12 and the transport plate 14 will in no way be blocked and it is capable of exhibiting a satisfactory vibration absorbing effect.

If a suction hose were dragged over the platform 11 during the movement of the exposure mount (or platen) so that it contacted various members on the platform 11, there would occur variations in load or vibrations (vibrations can also take place in the suction means itself), causing unevenness in the speed of movement of the exposure mount (or platen) or vibrations. However, these problems are absent if the recording material is fixed onto the platen 12 by electrostatic attraction and it can be transported for scanning in a more correct way.

The transporting apparatus according to the third aspect of the present invention is similar to the transporting apparatus according to the first aspect in that the method of fixing the recording material onto the platen is in no way limited but that in order to avoid the above-described adverse effects of a suction hose, it is preferred to adopt a method that is capable of fixing the recording material in such a way that the platen will not contact any other members.

While the transporting apparatus of the present invention has been described above in detail, it should of course be understood that the present invention is by no means limited to the embodiments described hereinabove but that various modifications and improvements can be made without departing from the spirit and scope of the invention.

As described in detail on the foregoing pages, the transporting apparatus of the present invention is basically of such a type that the recording material is transported for scanning by moving the exposure mount with the aid of a screw transmission mechanism. According to the first aspect of the invention, the exposure mount is composed of a platen for fixing the recording material and a transport plate which engages the screw transmission mechanism and the two components are designed to be displaceable independently of each other, preferably in a non-contact manner. Because of this arrangement, not only vibrations that originate from the drive system to be transmitted to the exposure mount through the nut, as exemplified by erratic rotation or vibrations of the motor or the screw shaft, but also vibrations that originate from externally applied forces can be effectively absorbed to minimize the erratic movement of the exposure mount.

In the transporting apparatus according to the third aspect of the present invention, the exposure mount for transporting the recording material for scanning is composed of a platen for fixing the recording material in position and a transport plate that holds the platen and which engages the drive unit such as the screw transmission mechanism, with a vibration system being formed in the coupling between the platen and the transport plate. The vibration system is capable of effectively absorbing all vibrations that are externally applied at frequencies lower than its resonant frequency and which include not only erratic rotation of the motor and the screw shaft but also impacts that develop when the exposure mount rides over the seams of guide members, as well as vibrations due to the rotation or rolling of the bearings or rollers in members that contact the guide members.

Another advantage of this arrangement is that vibrations due, for example, to erratic rotation of the motor need not be absorbed by means of the portion in which the transport plate engages the drive unit; hence, the transport plate can be brought into fixed engagement with the drive unit, thereby eliminating any adverse external effects such as variations in the load of moving the transport plate that occur due to uneven friction between the transport plate and the guide members.

Those advantages of the first and third aspects of the present invention are retained in the scanned transport devices according to the second and fourth aspects. In addition, they do not use any suction apparatus or means such as a vacuum pump, a suction pump or a suction hose that will cause vibrations in the exposure mount or variations in the load of its movement and, instead, they fix the recording material by electrostatic attraction; therefore, the scanned transport devices according to the second and fourth aspects of the present invention are free from any adverse effects that would otherwise be caused to the scanned transport of the recording material on account of vibrations or load variations exerted by a suction means such as a suction hose.

Consequently, the transporting apparatus for scanning exposure according to any aspect of the present invention is capable of transporting the recording material for sub-scanning with a very high precision without causing any unevenness in the transport speed and, hence, allows a high-quality image to be recorded without causing any unevenness in density and color in the sub-scanning direction.

What is claimed is:

1. A transporting apparatus for scanning exposure of a recording material which comprises:

a screw transmission mechanism having a drive screw and a travelling nut that meshes with said drive screw;

an exposure mount comprising: a platen for carrying said recording material; a transport plate having an underside; and platen displacement means for coupling said transport plate to said platen such that said platen is displaced relative to said transport plate such that movements of said platen and said transport plate substantially coincide, and wherein said transport plate engages with the travelling nut of said screw transmission mechanism such that said screw transmission mechanism drives the transport plate; and an engaging means provided on the underside of said transport plate for achieving engagement between said transport plate and said screw transmission mechanism.

2. An apparatus according to claim 1, wherein said platen displacement means displaces said platen in such a way that said platen does not contact said transport plate.

3. An apparatus according to claim 2, wherein said platen displacement means is capable of keeping said platen afloat by magnetic force so that said platen does not contact any part of said transport plate.

4. An apparatus according to claim 1, wherein said engaging means is capable of fixing the travelling nut of said screw transmission mechanism to the underside of the transport plate of said exposure mount.

5. An apparatus according to claim 1, wherein said engaging means has first and second support members on opposite sides of the travelling nut of said screw transmission mechanism that are attached to said transport plate and an urging member that is interposed between said first support member and said travelling nut, said urging member pressing said travelling nut against said second support member so that said nut engages fixedly with said transport plate.

6. An apparatus according to claim 1, wherein said engaging means has two support members that are attached to said transport plate in a position that crosses over the travelling nut of said screw transmission mechanism in a direction of movement of said nut and two urging members that are provided on opposite sides of said nut in such a way that each urging member is interposed between either of said support members and said nut, said urging members pressing said travelling nut from opposite sides so that said nut engages with said transport plate.

7. An apparatus according to claim 1, wherein said recording material has a recording layer on an electroconductive support, the platen of said exposure mount having a base at least part of which is formed of a electroconductive material, said apparatus further including a power supply for applying a voltage to both the conductive support of said recording material and the base of said platen so that said recording material is fixed to said platen by electrostatic attraction.

8. An apparatus according to claim 7, wherein said platen displacement means displaces said platen in such a way that said platen does not contact said transport plate.

9. An apparatus according to claim 8, wherein said platen displacement means is capable of keeping said platen afloat by magnetic force so that said platen does not contact any part of said transport plate.

10. An apparatus according to claim 7, wherein said engaging means is capable of fixing the travelling nut of said screw transmission mechanism to the underside of the transport plate of said exposure mount.

11. An apparatus according to claim 7, wherein said engaging means has first and second support members on opposite sides of the travelling nut of said screw transmission mechanism that are attached to said transport plate and an urging member that is interposed between said first support member and said travelling nut, said urging member pressing said travelling nut against said second support member so that said nut engages fixedly with said transport plate.

12. An apparatus according to claim 7, wherein said engaging means has two support members that are attached to said transport plate in a position that crosses over the travelling nut of said screw transmission mechanism in the direction of movement of said nut and two urging members that are provided on opposite sides of said nut in such a way that each urging member is interposed between either of said support members and said nut, said urging members pressing said travelling nut from opposite sides so that said nut engages with said transport plate.

13. An apparatus according to claim 1, wherein said exposure mount has urging members that couple said platen and said transport plate and which combine with said platen and said transport plate to compose a vibration filter.

14. An apparatus according to claim 13, wherein the transport plate of said exposure mount further has dampers attached thereto for acting on said platen.

15. An apparatus according to claim 13, wherein said exposure mount has a platen displacement means for supporting said platen in such a way that except for the urging members as components of said vibration filter, said platen does not contact said transport plate.

16. An apparatus according to claim 15, wherein said platen displacement means is capable of keeping said platen afloat by magnetic force so that said platen does not contact any part of said transport plate.

17. An apparatus according to claim 13, wherein said engaging means is capable of fixing the travelling nut of said screw transmission mechanism to the underside of the transport plate of said exposure mount.

18. An apparatus according to claim 13, wherein said engaging means has first and second support members on opposite sides of the travelling nut of said screw transmission mechanism that are attached to said transport plate and an urging member that is interposed between said first support member and said travelling nut, said urging member pressing said travelling nut against said second support member so that said nut engages fixedly with said transport plate.

19. An apparatus according to claim 13, wherein said engaging means has two support members that are attached to said transport plate in a position that crosses over a travelling nut of said screw transmission mechanism in a direction of movement of said nut and two urging members that are provided on opposite sides of said nut in such a way that each urging member is interposed between either of said support members and said nut, said urging members pressing said travelling nut from opposite sides so that said nut engages with said transport plate.

20. An apparatus according to claim 13, wherein said recording material has a recording layer on an electroconductive support, the platen of said exposure mount having a base at least part of which is formed of an electroconductive material, said apparatus further including a power supply for applying a voltage to both the conductive support of said recording material and the base of said platen so that said recording material is fixed to said platen by electrostatic attraction.

* * * * *